Oct. 12, 1965
K. R. SKINNER ETAL  3,211,951
CIRCUIT FOR AUTOMATICALLY DISABLING AN ELECTRICAL
CIRCUIT AFTER A PREDETERMINED TIME DELAY
Filed Jan. 11, 1961
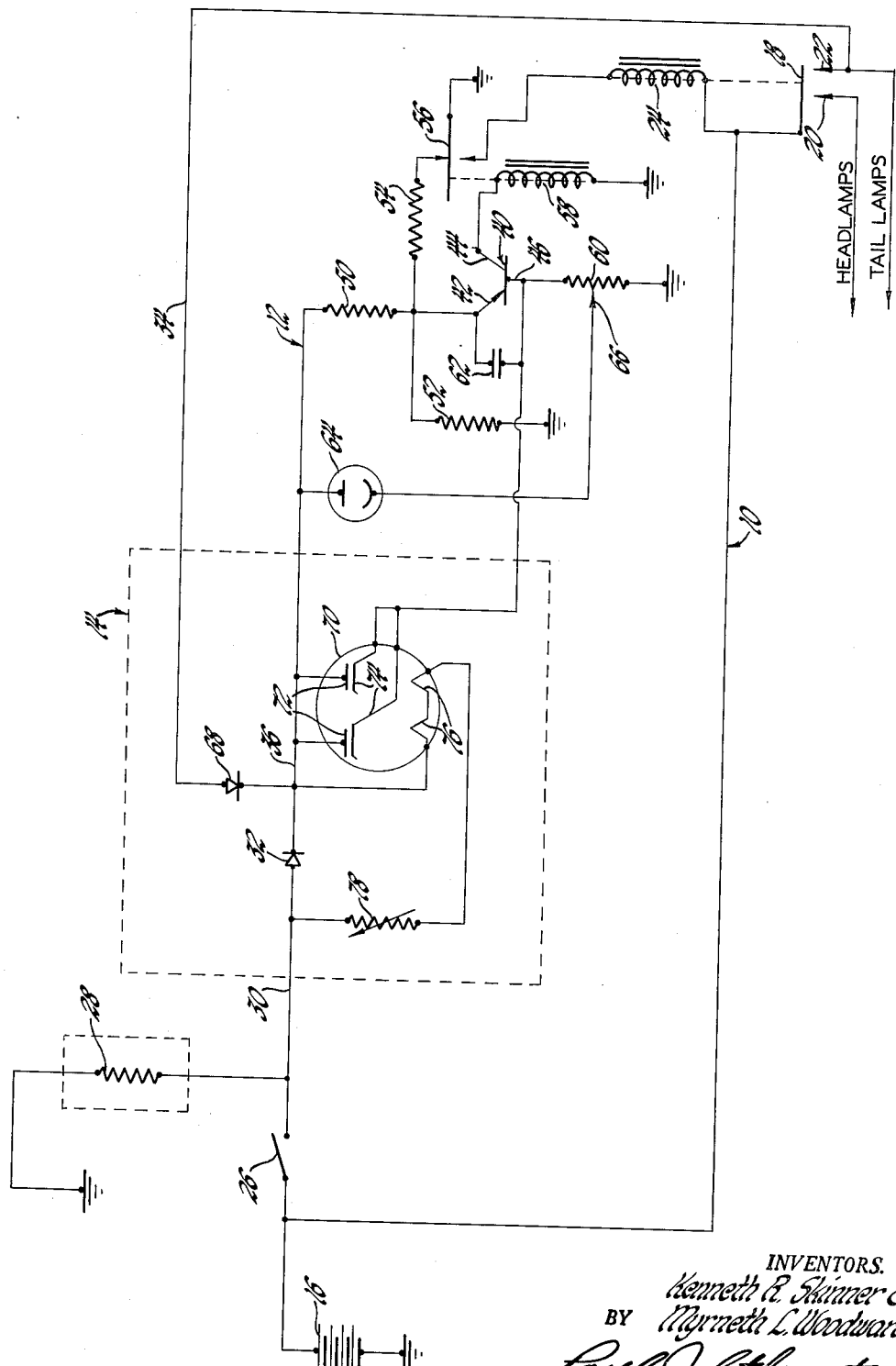
INVENTORS.
Kenneth R. Skinner &
BY  Myrneth L. Woodward
Paul J. Ethington
ATTORNEY

United States Patent Office 3,211,951
Patented Oct. 12, 1965

3,211,951
CIRCUIT FOR AUTOMATICALLY DISABLING AN ELECTRICAL CIRCUIT AFTER A PREDETERMINED TIME DELAY
Kenneth R. Skinner, Anderson, and Myrneth L. Woodward, Lapel, Ind., assignors to General Motors Corporation, Detroit, Mich., a corporation of Delaware
Filed Jan. 11, 1961, Ser. No. 82,039
12 Claims. (Cl. 315—76)

This invention relates to a time delay circuit and more particularly to a time delay circuit for use in conjunction with an automatic headlight on-off switch.

In many cases it is desirable upon leaving an automobile in the night time to keep the headlights lit so that the occupants leaving the automobile will have sufficient light to safely reach their destination.

It is an object of this invention to provide an automatic headlight on-off switch with a time delay. Another object is to provide an improved time delay circuit.

This invention is carried out by providing a time delay circuit including a hot cathode vacuum tube which is arranged to have its heater filaments energized. After a predetermined period of time the heater filaments will become hot enough to cause the vacuum tube to conduct thereby creating a signal which may be used to actuate a headlight switch or other device.

The above and other advantages of this invention will be made more apparent from the following specification taken in conjunction with the accompanying drawing which is a schematic circuit diagram of an automatic headlight on-off switch embodying the invention.

Referring to the drawing, the circuit comprises a headlight power circuit 10, a control circuit 12 and a time delay circuit 14 all of which are energized by a battery 16. The headlight circuit 10 is connected directly to the battery 16 and leads to a power relay armature 18 which is connectable with the contact 20 leading to the headlights and the contact 22 leading to the tail lights. The power relay coil 24 also is connected to the headlight circuit.

In a conventional manner the battery 16 is connected to an ignition switch 26 which is adapted to close the circuit leading to the ignition system depicted in the drawings as a resistance 28 in a broken line box. A main power supply line 30 leads from the ignition switch 26 to supply current to the time delay circuit 14 and the control circuit 12 and includes a rectifier 32 which permits current flow to the control circuit 12 but prohibits reverse current flow. An auxiliary power supply line 34 from the tail light circuit joins the main supply line 30 to form a common supply line 36.

The control circuit 12 basically is the same as that shown by the patent to Matkins 2,888,611 and includes a transistor 40 having an emitter electrode 42, collector electrode 44 and a base terminal 46. The power input to the emitter electrode 42 is through the voltage divider comprising a pair of resistors 50 and 52, the first 50 being in series and the second 52 being in parallel with the transistor 40. During certain conditions, a third resistor 54 will be in parallel with the transistor 40 and is controlled by a sensitive relay armature 56 which connects the third resistor 54 to ground. The collector electrode 44 of the transistor 40 is connected through a sensitive relay coil 58 to ground so that when the transistor 40 is conductive the relay coil 58 will be operative to hold down the armature 56. A biasing resistor 60 is positioned between the base terminal 46 of the transistor and ground, and a condenser 62 is placed between the emitter and base. A photoelectric cell 64 is connected between the power supply line 36 of the control circuit 12 and a sliding contact 66 on the biasing resistor. The photoelectric cell 64 is preferably located to receive light from the sky.

In operation, when the ambient light is bright the photoelectric cell 64 will conduct current from the power supply line 36 through the biasing resistor 60 to ground. This will cause the transistor base 46 to remain sufficiently positive to prevent conduction from the emitter 42 to the collector 44. In that case the relay coil 58 will not be energized and the relay armature 56 will remain in the upper position as shown in the drawing. However, when the ambient light from the sky becomes very dim the photoelectric cell 64 will not conduct sufficient current to bias the transistor 40 to cut off; then current will flow through the transistor 40, and the sensitive relay coil 58 will be energized to pull the armature down. In this condition, the coil of the power relay coil 24 is grounded and power relay armature 18 is held down to connect the headlight and the tail light circuits to the headlight power supply circuit 10. It will be seen that as the sensitive relay armature 56 is pulled down the third resistor 54 is no longer grounded and the relative values of resistance of the voltage divider are changed so that the emitter voltage is increased. The effect of this is that in order to decrease the amount of collector current to cut-off a greater biasing current is required as compared to that necessary to cause the transistor to conduct. Thus during border line conditions of ambient light the switch 56 will not open and close with very small variations in light. The condenser 62 between the emitter 42 and base 46 provides a time delay which would prevent transient currents from causing the switch 56 to open and close. In order to permit the adjustment of the amount of light which would cause the transistor 40 to cut off or on, the sliding contact 66 is provided on the biasing resistor so that the biasing voltage developed by a given amount of current from the photoelectric cell 64 may be varied.

The time delay circuit 14, as mentioned previously, includes a main power supply line 30 including a rectifier 32 and in addition has an auxiliary power supply line 34 between the tail light circuit and the common supply line 36. This auxiliary supply line 34 also contains a rectifier 68 to prevent current flow to the tail light circuit when the power relay 24 is deenergized. A vacuum tube 70, depicted in the drawings as a twin diode, has its plates 72 connected to the common supply line 36 and its cathodes 74 connected to the transistor base 46. The heater filaments 76 of the tube 70 are connected from the common supply line 36 through a variable resistor 78 to the main supply line 30.

In operation, when the ignition switch 26 is closed current will flow through the rectifier 32 to the control circuit which latter will operate as described above. The voltage drop across the rectifier 32 will be so small that no appreciable amount of current will flow through the heater filaments 76. When the ambient light is low so that the power relay armature is energized and the headlights and tail lights are lit voltage will be supplied through the auxiliary power supply line 34. When the ignition switch is opened to remove the voltage from the main supply line 30 current will flow through the auxiliary line 34, the heater filaments 76, the variable resistance 78 and the ignition system 28 to ground, thereby causing the heater filaments 76 to become hot enough, after a time lapse, to permit the vacuum tube 70 to conduct. Current will then flow from the vacuum tube 70 to the biasing resistor 60, thereby raising the base potential to cut off the transistor current flow, deenergizing the relays 24 and 58, and turning off the lights. During the switch operation, the voltage is also removed from the auxiliary supply line 34 with the end result that the entire system is deenergized.

The purpose of the variable resistor 78 is to permit the manual selection of the desired amount of time delay. When a 12 AL5 vacuum tube is utilized, an appropriate variable resistor 78 will be one operating in the neighborhood of 15 ohms. Typically an ignition system has a resistance of about 14 ohms when the engine is not operating and it has been found that this resistance in series with a 15 ohms resistance will provide a time delay of about 20 seconds when operating on a conventional 12 volt electrical system. This time delay in most instances would be sufficient to permit a person to reach his destination when departing from the vehicle, yet it insures that the lights would not drain a large amount of energy from the battery 16 before they are turned off.

It is contemplated that this time delay circuit is not limited in the application to vehicle lighting circuits but may be appropriately used in other electrical circuits where a very simple and reliable time relay is desired. It is recognized that many variations of the circuit as described may be made without departing from the spirit of the invention, and the scope of the invention is limited only by the following claims:

We claim:

1. An automatic headlamp switching circuit including a headlamp circuit having switch means for connecting headlamps to a vehicle battery, a control circuit for actuating said switch means, a manually operated switch connecting said control circuit to said battery, a time delay means comprising a vacuum tube having an anode and a cathode connected to the control circuit and a filament to heat the cathode, the time delay means further comprising means responsive to opening of the manually operated switch to apply a voltage across the filament for causing vacuum tube current flow to the control circuit and for enabling the control circuit to open said switch means a predetermined time after opening of said manually operated switch.

2. An automatic headlamp switching circuit as described in claim 1 wherein variable resistance means in series with said filament permits adjustment of the filament voltage and hence of the amount of time delay.

3. In a time delay circuit for supplying current to a load, a time delay means comprising a hot cathode diode for controlling said circuit, said diode having a heater filament, a first voltage source in series with said filament to supply current thereto, means to apply a second voltage to the filament to counteract the voltage from said first source, whereby the diode is non-conductive when the second voltage is applied and is rendered conductive a predetermined time after the second voltage is removed.

4. In a time delay circuit as described in claim 3, a variable resistance means in series with said filament for adjustably regulating the current flow therethrough and hence the period of time delay.

5. An automatic headlamp control circuit including a normally conducting transistor switch having a resistor connected between the transistor base and ground whereby the transistor may be biased to cut off by passing a suitable current through said resistor, a time delay system comprising a hot cathode diode having a heater filament connected with said circuit, the heater filament in said diode having a rated operating voltage, means for applying a voltage substantially lower than the rated voltage across said filament whereby the time required to heat the filament to operating temperature for diode conduction affords a time delay, and means for applying the diode current to said resistor thereby biasing the transistor to cut off after the said time delay.

6. An automatic headlamp switching circuit including a headlamp circuit having switch means connecting said headlamps to a power source, a control circuit for actuating said switch means including a normally conducting transistor switch having a resistor connected between the transistor base and ground whereby the transistor may be biased to cut off by passing a suitable current through said resistor, a manually operated switch connecting said control circuit to said power source, a time delay means comprising a hot cathode diode having a filament connected with said control circuit, the filament of said diode having a rated operating voltage, means operative when the manually operated switch is open for applying a voltage substantially lower than the rated voltage across said filament whereby the time required to heat the filament to operating temperature for diode conduction affords a time delay, and means for applying the diode current to said resistor thereby biasing the transistor to cut off a predetermined time after opening of said manually operated switch.

7. An automatic headlamp switching circuit including a headlamp circuit having switch means connecting said headlamps to a power source, a control circuit for actuating said switch means including a normally conducting transistor switch having a resistor connected between the transistor base and ground whereby the transistor may be biased to cut off by passing a suitable current through said resistor, a manually operated switch connecting said control circuit to said power source, a time delay means comprising a hot cathode electron tube having a filament connected with said circuit, the filament of said tube having a rated operating voltage, means for applying a voltage substantially lower than the rated voltage across said filament whereby the time required to heat the filament to operating temperature for tube conduction affords a time delay, and means for applying the tube current to said resistor thereby biasing the transistor to cut off a predetermined time after opening of said manually operated switch.

8. An automatic headlamp switching circuit including a headlamp circuit having switch means connecting said headlamps to a power source, a control circuit for actuating said switch means, including a manually operated switch connecting said control circuit to said power source, a time delay system comprising a hot cathode diode having a filament connected with said circuit, the filament of said diode having a rated operating voltage, means for applying a voltage substantially lower than the rated voltage across said filament whereby the time required to heat the filament to operating temperature for diode conduction affords a time delay, and means for applying the diode current to said control circuit to open said switch means a predetermined time after opening of said manually operated switch.

9. An automatic headlamp switching circuit comprising a headlamp circuit including a line from a vehicle battery to said headlamps through a switch, a control circuit including signal responsive means for opening said switch, a power supply for said control circuit including a main line from said battery containing a manual switch and an auxiliary line from the headlamp circuit, and time delay means including a resistive leak path to ground, a hot cathode vacuum tube connected between said lines and said signal responsive means, a vacuum tube filament circuit connected between said lines and the resistive leak path whereby when said headlamps are on said manual switch is opened current flows from the auxiliary supply line through the diode filaments and the resistive leak path to ground for slowly heating said filament to operating temperature to cause conduction of current by said diode and to provide the signal to the signal responsive means for switching off the headlamps a predetermined time after opening of said manual switch.

10. An automatic headlamp switching circuit comprising a headlamp circuit including a line from a vehicle battery to said headlamps through a switch, a control circuit including signal responsive means for opening said switch, a power supply for said control circuit including a first line from said battery containing a manually operated switch and a second line from the headlamp circuit, said first and second lines being joined to form a common supply line, a rectifier in each of the first and second lines to prevent current flow thereto from the common supply line, and time delay means including a resistive leak path to ground from a point between the manual switch and the rectifier in the first line, a hot cathode diode between the common supply line and the control circuit for providing the signal for said signal responsive means, a diode filament circuit connected from the common supply line to the resistive leak path whereby when said headlamps are on and said manual switch is opened current flows from the second supply line to the common supply line through the diode filaments and the resistive leak path to ground for slowly heating said filaments to operating temperature to cause conduction of current by said diode and to provide the said signal for switching off the headlamps a predetermined time after the opening of said manual switch.

11. An automatic headlamp switching circuit for an automotive vehicle comprising a headlamp circuit including a line from a vehicle battery to said headlamps through a switch, a control circuit including signal responsive means for opening said switch, a power supply for said control circuit including a first line from said battery containing a manually operated ignition switch, and a second line from the headlamp circuit, said first and second lines being joined to form a common supply line, a rectifier in each of the first and second lines to prevent current flow thereto from the common supply line, and time delay means including a resistive leak path through the ignition system to ground from a point between the ignition switch and the rectifier in the first line, a hot cathode diode between the common supply line and the control circuit for providing said signal for said signal responsive means, a diode filament circuit connected from the common supply line to the first said line so that when said headlamps are on and said ignition switch is closed there is no voltage drop across said filaments and when said headlamps are on and said ignition switch is opened current flows from the second supply line to the common supply line through the diode filaments and the resistive leak path to ground for slowly heating said filament to operating temperature to cause conduction of current by said diode and, consequently, providing the said signal for switching off the headlamps a predetermined time after the opening of said ignition switch.

12. In a time delay circuit for supplying current to a load, a hot cathode diode for controlling said current, said diode having a heater filament, a first voltage source in series with said filament for supplying current thereto and to said load, a second voltage source in series with said filament for counteracting the effect on the filament of the first voltage source, said second voltage source being connected for supplying current to said load through a unilateral circuit element to prevent back flow of current from the first voltage source, and means to disconnect said second voltage source whereby the diode is nonconductive when the second voltage source is connected and is rendered conductive a predetermined time after the second voltage is removed.

References Cited by the Examiner

UNITED STATES PATENTS

| | | | |
|---|---|---|---|
| 2,421,994 | 6/47 | Cooper | 315—94 X |
| 2,534,299 | 12/50 | Ruiz et al. | 315—107 |
| 2,802,142 | 8/57 | Johnson | 315—360 X |
| 2,806,980 | 9/57 | Shapiro | 315—83 |
| 2,912,685 | 11/59 | Thomas | 340—377 |

DAVID J. GALVIN, *Primary Examiner.*

ARTHUR GAUSS, *Examiner.*